(12) United States Patent
Jaaskelainen et al.

(10) Patent No.: US 11,015,996 B2
(45) Date of Patent: May 25, 2021

(54) ELECTRO ACOUSTIC TECHNOLOGY (EAT) FOR REAL TIME INTELLIGENT PIGGING

(71) Applicant: Halliburton Energy Services, Inc., Houston, TX (US)

(72) Inventors: Mikko Jaaskelainen, Katy, TX (US); Brian V. Park, Austin, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 364 days.

(21) Appl. No.: 16/305,022

(22) PCT Filed: Jul. 26, 2016

(86) PCT No.: PCT/US2016/044003
§ 371 (c)(1),
(2) Date: Nov. 27, 2018

(87) PCT Pub. No.: WO2018/022012
PCT Pub. Date: Feb. 1, 2018

(65) Prior Publication Data
US 2020/0319051 A1 Oct. 8, 2020

(51) Int. Cl.
*G01N 29/24* (2006.01)
*G01N 29/265* (2006.01)
*G01M 3/00* (2006.01)

(52) U.S. Cl.
CPC ........ *G01M 3/005* (2013.01); *G01N 29/2418* (2013.01); *G01N 29/265* (2013.01);
(Continued)

(58) Field of Classification Search
CPC ............. G01N 29/2418; G01N 29/265; G01N 2291/2636; G01N 2291/0258; G01M 3/005
(Continued)

(56) References Cited

U.S. PATENT DOCUMENTS 6,913,079 B2 * 7/2005 Tubel .................... E21B 47/135
166/250.01
8,973,444 B2 3/2015 Hill et al.
(Continued)

FOREIGN PATENT DOCUMENTS

WO 2015002701 A1 1/2015
WO 2015020642 A1 2/2015
(Continued)

OTHER PUBLICATIONS

Acousto-Ultrasonic Optical Fiber Sensors: Graham et al., Overview and State-of-the-Art Jul. 2008 (Year: 2008).*
(Continued)

*Primary Examiner* — Jacques M Saint Surin
(74) *Attorney, Agent, or Firm* — Gilliam IP PLLC

(57) ABSTRACT

A new approach to pipeline pigging using electro acoustic technology (EAT) is described in which the data from a pigging operation can be transmitted in real time to optical fiber on the outside of the pipeline and detected using distributed acoustic sensing (DAS) techniques, including the precise location, velocity and acceleration of the pig using the DAS technique. Thus the sensor data can easily be mapped to its precise location in real time. The EAT sensors use the DAS fiber as a data transmission line by converting electrical or optical signals to acoustic signals which excite the fiber and can be detected by an interrogator at the pig launch site.

17 Claims, 2 Drawing Sheets

(52) U.S. Cl.
CPC .............. *G01N 2291/0258* (2013.01); *G01N 2291/2636* (2013.01)

(58) Field of Classification Search
USPC .......................................................... 73/40.5
See application file for complete search history.

(56) References Cited

U.S. PATENT DOCUMENTS

| | | | |
|---|---|---|---|
| 9,453,821 B2* | 9/2016 | Minto | F17D 5/005 |
| 9,557,195 B2* | 1/2017 | Barfoot | G01D 5/35312 |
| 10,031,044 B2* | 7/2018 | Kumar | G01M 5/0091 |
| 10,900,860 B2* | 1/2021 | Hill | G01D 5/48 |
| 2003/0205428 A1 | 11/2003 | Chang | |
| 2008/0149416 A1 | 6/2008 | Coates et al. | |
| 2009/0132183 A1* | 5/2009 | Hartog | G01K 1/143 702/42 |
| 2011/0139538 A1* | 6/2011 | Hill | G01P 3/14 181/123 |

FOREIGN PATENT DOCUMENTS

| | | |
|---|---|---|
| WO | 2015084348 A1 | 6/2015 |
| WO | 2015114367 A2 | 8/2015 |

OTHER PUBLICATIONS

Fiber Optic Sensors in Structural Health Monitoring, López-Higuera et al., Feb. 2011 (Year: 2011).*
PCT Application Serial No. PCT/US2016/044003, International Search Report, dated Apr. 18, 2017, 3 pages.
PCT Application Serial No. PCT/US2016/044003, International Written Opinion, dated Apr. 18, 2017, 5 pages.

* cited by examiner

ELECTRO ACOUSTIC TECHNOLOGY (EAT) FOR REAL TIME INTELLIGENT PIGGING

BACKGROUND

There are roughly 2.2 million miles of pipeline worldwide, with 120,000 miles being added each year. Over ⅔ of the crude oil in the US is moved by pipeline in the largest network of trunkline systems in the world. Refined products are pumped all over the country, generally in smaller diameter pipelines. Natural gas pipelines total more than 305,000 miles in the US alone. Pipelines are inspected and cleaned using pigging, and intelligent pigs are used to detect anomalies in the pipe such as dents, corrosion, cracking, leaks, etc. Pigs are also used to separate different products in a multi-product pipeline. These devices are launched from pig launcher stations and travel through the pipeline to be received by another station downstream. The pressure of the product flow in the pipeline itself propels the pigs.

Intelligent pigging records information such as high-resolution caliper measurement for inline inspection of pipelines, magnetic flux leakage, or ultrasonic, for measuring buildup of material on the inner walls, and for leak, corrosion and rupture detection. The pig contains a computer, odometers and gyroscopes, and memory storage. Once the pig has travelled through the pipeline the data is retrieved and matched to its GPS locations based on external reference sensors that may record a time stamp when the pig pass the location or transmit a time stamp to the pig as it passes. The pig itself cannot use GPS as the metal pipe blocks satellite signals. The data is not transmitted in real time and can only be reviewed after the event, due to limitations of transmission techniques from inside a metal pipeline. This limits response time to ongoing events such as detecting leaks or ruptures.

There is a need then for a new approach to pigging. One that transmits the data in real time, with much better accuracy with respect to providing real time positioning, and is less expensive with the traditional approaches.

BRIEF DESCRIPTION OF THE DRAWINGS

Elements in the figures have not necessarily been drawn to scale in order to enhance their clarity and improve understanding of these various elements and embodiments of the application. Furthermore, elements that are known to be common and well understood to those in the industry are not depicted in order to provide a clear view of the various embodiments of the application, thus the drawings are generalized in form in the interest of clarity and conciseness.

DETAILED DESCRIPTION

Figure 1:
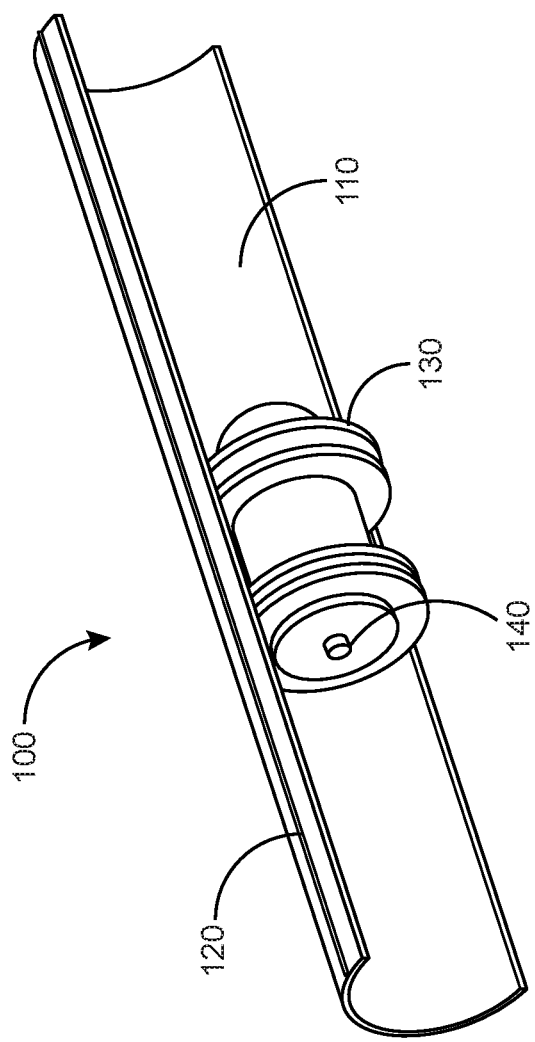
FIG. 1 illustrates an EAT based intelligent pig.

In the following detailed description, reference is made to accompanying drawings that illustrate embodiments of the present disclosure. These embodiments are described in sufficient detail to enable a person of ordinary skill in the art to practice the disclosure without undue experimentation. It should be understood, however, that the embodiments and examples described herein are given by way of illustration only, and not by way of limitation. Various substitutions, modifications, additions, and rearrangements may be made without departing from the spirit of the present disclosure. Therefore, the description that follows is not to be taken in a limited sense, and the scope of the present disclosure will be defined only by the final claims.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

Description of EAT (Electro Acoustic Technology) Sensors

The EAT sensors and EAT sensing technology described in this disclosure is a recently developed technology and has been described in a recently published PCT application: WO2015020642A1.

EAT Sensors represent a new approach to fiber optic sensing in which any number of sensors, electronic or fiber optic based, can be utilized to make the basic parameter measurements, but all of the resulting information is converted at the measurement location into perturbations or a strain applied to an optical fiber that is connected to an interrogator. The interrogator may routinely fire optical signal pulses into the optical fiber. As the pulses travel down the optical fiber back scattered light is generated and is received by the interrogator.

The perturbations or strains introduced to the optical fiber at the location of the various EAT sensors can alter the back propagation of light and those effected light propagations can then provide data with respect to the signal that generated the perturbations.

The possible advantages from using the above described EAT systems in a variety of configurations may include using a variety of sensors, either electrical or fiber optic based, to measure for example a chemical concentration, a pH, a temperature, or a pressure and using a common optical fiber connected to a interrogator to measure perturbation signals from each EAT sensor assembly location distributed along that common optical fiber and analyzing those signals to extract values of the parameters being measured. Regardless of the types of sensors used all of the information to the surface is sent by DAS telemetry. The approach can significantly reduce manufacturing complexity, reduce very expensive labor intensive production with expensive equipment like splicers and fiber winders, improve reliability, and widen industry acceptance by allowing the use of sensing technologies of choice.

With electro acoustic technology (EAT) the data can be transmitted in real time to optical fiber on the outside of the pipeline and detected using distributed acoustic sensing (DAS) techniques. Additionally the precise location, velocity and acceleration of the pig can be detected using the DAS technique. Thus the sensor data can easily be mapped to its precise location in real time. The EAT sensors use the DAS fiber as a data transmission line by converting electrical signals to acoustic signals which excite the fiber and can be detected by an interrogator at the pig launch site or at various locations along the pipeline like e.g. pump stations. The fiber acts as both a sensor for continuous acoustic monitoring over the entire length of the pipeline, as well as a transmission method for the pig. The DAS can be used for continuous leak detection when not being used with the pig. The fiber can also be used for continuous temperature measurement over the entire length of the pipeline using distributed temperature sensing (DTS) techniques. The same fiber cable may also include additional optical fibers used for communication and control of the pipeline system.

Where dumb pigs are used for pipeline cleanup or for batch separation and no data is being recorded, an EAT sensor can be added easily to the pig to provide precise real time location. The EATs are self-contained, autonomous and much simpler, smaller and cheaper than current intelligent pig technologies. They require no memory storage device, inertial navigation system, etc. They use very low power so that the batteries can be small. Thus they can be used in much smaller pipes than current systems. They are low cost devices and can be used economically in much smaller pipes that were previously cost prohibitive for intelligent pigs. Technology transfer from downhole EAT design ensures that the EAT is capable of withstanding high pressures and temperatures and corrosive fluids. Indwelling sensors can also transmit temperature and pressure and other parameters.

Where pigs are being used to separate different batches of fluids, such as diesel and gasoline, multiple pigs with EAT technology can be used simultaneously on the same fiber. Thus the location of both the beginning and end of the batch can be known in real time as the fluid travels along the pipe. This can also reduce the amount of transmix, the hybrid product created by intermixing at the interface between two dissimilar fluids, which must be channeled to separate storage and reprocessed. Many different batches can be monitored simultaneously.

Turning first to FIG. 1, shown generally as 100, a pig 130 with an EAT device 140 mounted in its body is illustrated within a pipeline 110. A Distributed Acoustic Sensing (DAS) fiber 120 is shown mounted on the outside of the pipeline. The fiber is connected to a DAS interrogator (not shown), which may be permanently or temporarily attached at a pigging station or similar location. The interrogator may also be portable so that it can be transported to another location along the pipeline. The interrogator may also be capable of switching to multiple fibers so that it can collect data from the first fiber upstream and the second fiber downstream, thus doubling the pipeline length of interrogation.

The pig can be of any diameter to suit the pipeline diameter being monitored. The pig may contain separate sensors and measuring devices or none at all. Sensors commonly used on intelligent pigs include sensors to measure surface pitting and corrosion, as well as cracks and weld defects in steel/ferrous pipelines, and this is often detected using magnetic flux leakage (MFL) sensors. Other sensors may include electromagnetic acoustic transducers to detect pipe defects. Calipers can measure the roundness of the pipeline to determine areas of crushing or other deformations. Some smart pigs use a combination of technologies, such as providing MFL and caliper functions in a single tool. Pigs with EAT modules may also include sensors to measure temperature and pressure. The EAT device is an adaption of the downhole EAT devices. It is capable of withstanding high pressures and temperatures, and corrosive fluids.

Figure 2:
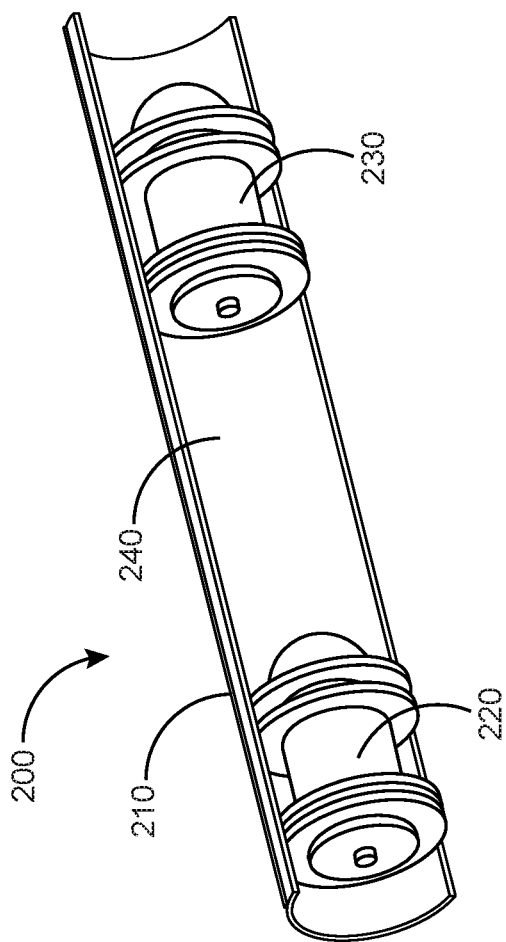
FIG. 2 illustrates multiple batched pigs.

For batch processing, an EAT sensor at the beginning and the end of the batch provides location of the batch as it travels along the pipeline. This is illustrated in FIG. 2, shown generally as 200. Two batch pigs 220, 230 are illustrated surrounding a batch fluid 240. Deployed completely along the outside of the pipeline is a DAS fiber that is in communication with a DAS interrogator (not shown). In this application each EAT sensor provides its position and is detected independently by the DAS system.

Current mass balance leak detection systems where temperature and pressure is measured at dedicated locations along the pipeline may be able to detect leak volumes of around 1% due to uncertainty in line pack, thermal variations along the pipeline, pressure fluctuations etc. Dedicated locations may be pump stations, refineries, pipeline junctions or crossings, and these locations may be 10's to 100's of km apart in some cases. The further apart the sensing locations are, the larger the uncertainty in the leak detection measurement due to the larger volume of product and exposure to line pack, temperature and pressure fluctuations. The volume is proportional to pipeline length and cross sectional area, and mass balance systems calculate changes in volumetric flow. A leak would be a smaller deviation if the total volume is larger, and the uncertainty in conventional mass balance systems increase with increased sensor spacing.

Multiple pigs equipped with pressure and temperature sensors can be launched with a known spacing, and with the known spacing being significantly smaller than the spacing between e.g. pump stations where sensors for conventional systems may reside, so a reduction in spacing between the pigs may be attributed to a volume reduction due to e.g. a leak once the volume is compensated for thermal and pressure induced volume fluctuations. The improved positional accuracy combined with real time pressure and temperature measurements allows users to provide a more accurate leak detection system and detect smaller leaks than existing mass balance leak detection systems.

Value Added

The EAT/DAS technology provides real time transmission of pipeline data that was previously only available after the event, due to transmission limitations through the pipeline walls.

The EAT pigging technology system is more accurate than previous DAS pigging systems, providing real time position within 3 feet, while existing systems are limited to 60 to 90 feet.

The technology is smaller and uses much less power so that it can be attached to dumb pigs and add intelligent capabilities, such as batch monitoring.

The technology is simpler than existing technology since it does not require positioning equipment, large memory, and large batteries, and is therefore cheaper.

This approach offers real time data transmission and display of intelligent pig sensing using EAT and DAS technology, only previously available as after the event data.

Low cost EAT sensors can be fixed to any dumb pig, including for batch monitoring, not previously available. Existing dumb pigs can be retrofitted and upgraded to an intelligent pig by adding the EAT module.

Low power consumption, small size, enables smaller pipelines to be monitored which could not be monitored by intelligent pigs before.

Higher real time positional accuracy than currently available, thus improving time to find, and reducing cost to dig up leaks.

Although certain embodiments and their advantages have been described herein in detail, it should be understood that various changes, substitutions and alterations could be made without departing from the coverage as defined by the appended claims. Moreover, the potential applications of the disclosed techniques is not intended to be limited to the particular embodiments of the processes, machines, manufactures, means, methods and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized. Accordingly, the appended claims are intended to include within their scope such processes, machines, manufactures, means, methods or steps.

The invention claimed is:

1. An intelligent real time pipeline pigging system using electro acoustic technology (EAT) comprising:
   a. at least one pig structure configured to travel through a pipeline propelled by a product flow;
   b. at least one EAT sensor device mounted in each pig structure, wherein the EAT sensor device is configured to,
      i. measure downhole physical property data; and
      ii. convert an electric signal corresponding to the downhole physical property data into an acoustic signal;
   c. a distributed acoustic sensing (DAS) optical fiber mounted on the outside of the pipeline;
   d. a DAS interrogator system in communication with the DAS optical fiber to measure perturbation signals from each EAT sensor device.

2. The intelligent real time pipeline pigging system using EAT of claim 1, further comprising additional sensors contained within the EAT sensor.

3. The intelligent real time pipeline pigging system using EAT of claim 2, wherein the additional sensors comprise fiber optic sensors.

4. The intelligent real time pipeline pigging system using EAT of claim 2, wherein the additional sensors comprise electric based sensors.

5. The intelligent real time pipeline pigging system using EAT of claim 2, wherein the additional sensors comprise magnetic flux leakage sensors.

6. The intelligent real time pipeline pigging system using EAT of claim 2, wherein the additional sensors comprise electromagnetic acoustic transducers.

7. The intelligent real time pipeline pigging system using EAT of claim 2, wherein the additional sensors comprise pressure sensors.

8. The intelligent real time pipeline pigging system using EAT of claim 2, wherein the additional sensors comprise temperature sensors.

9. A method for intelligent real time pipeline pigging comprising:
   a. providing at least one pig structure configured to travel down a pipeline propelled by a product flow;
   b. providing at least one electro acoustic technology (EAT) sensor device mounted in each pig structure, wherein the EAT sensor device is configured to,
      i. measure downhole physical property data; and
      ii. convert an electric signal corresponding to the downhole physical property data into an acoustic signal;
   c. providing a distributed acoustic sensing (DAS) optical fiber mounted on the outside of the pipeline; and
   d. providing a DAS interrogator system in communication with the DAS optical fiber to measure perturbation signals from each EAT sensor device.

10. The method for intelligent real time pipeline pigging of claim 9 further comprising adding additional sensors contained within the EAT sensor.

11. The method for intelligent real time pipeline pigging of claim 10 wherein the additional sensors comprise fiber optic sensors.

12. The method for intelligent real time pipeline pigging of claim 10 wherein the additional sensors comprise electrical sensors.

13. The method for intelligent real time pipeline pigging of claim 10 wherein the additional sensors comprise magnetic flux leakage sensors.

14. The method for intelligent real time pipeline pigging of claim 10 wherein the additional sensors comprise electromagnetic acoustic transducers.

15. The method for intelligent real time pipeline pigging of claim 10 wherein the additional sensors comprise pressure sensors.

16. The method for intelligent real time pipeline pigging of claim 10 wherein the additional sensors comprise temperature sensors.

17. A method for leak detection in pipelines comprising:
   a. providing multiple pig structures equipped with pressure and temperature sensors configured with known spacings to travel down a pipeline propelled by a product flow;
   b. providing at least one electro acoustic technology (EAT) sensor device mounted in each pig structure;
   c. providing a distributed acoustic sensing (DAS) optical fiber mounted on the outside of the pipeline;
   d. providing a DAS interrogator system in communication with the DAS optical fiber to measure perturbation signals from each EAT sensor device, including pressure and temperature readings;
   e. using the provided DAS telemetry to monitor the position of each of the multiple pig structures;
   f. using a reduction in the spacing between any two pig structures to calculate a volume change between the pig structures due to a leak;
   g. using the provided pressure and temperature data to compensate the volume change between pig structures for changes in temperature and pressure.

* * * * *